US012755737B2

(12) United States Patent
Shoop et al.

(10) Patent No.: US 12,755,737 B2
(45) Date of Patent: Oct. 6, 2026

(54) AUTOMATED DEVICE ACTIVATION IN INTERACTIVE CONTENT

(71) Applicant: Adeia Guides Inc., San Jose, CA (US)

(72) Inventors: David D. Shoop, San Jose, CA (US); Dylan M. Wondra, Mountain View, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/732,274

(22) Filed: Jun. 3, 2024

(65) Prior Publication Data

US 2025/0078833 A1 Mar. 6, 2025

Related U.S. Application Data

(63) Continuation of application No. 17/355,849, filed on Jun. 23, 2021, now Pat. No. 12,033,626, which is a
(Continued)

(51) Int. Cl.
*G10L 15/22* (2006.01)
*G06F 16/635* (2019.01)
(Continued)

(52) U.S. Cl.
CPC ............ *G10L 15/22* (2013.01); *G06F 16/635* (2019.01); *G10L 13/00* (2013.01); *G10L 15/18* (2013.01);
(Continued)

(58) Field of Classification Search
CPC ........................................................ G10L 15/22
See application file for complete search history.

(56) References Cited

U.S. PATENT DOCUMENTS

| | | | |
|---|---|---|---|
| 6,421,453 | B1 | 7/2002 | Kanevsky et al. |
| 9,318,912 | B2 | 4/2016 | Baarman et al. |

(Continued)

FOREIGN PATENT DOCUMENTS

| | | | |
|---|---|---|---|
| CA | 3138709 | A1 | 11/2020 |
| WO | 2020077006 | A1 | 4/2020 |

(Continued)

OTHER PUBLICATIONS

He, Yitao, et al. "Canceling inaudible voice commands against voice control systems." The 25th Annual International Conference on Mobile Computing and Networking. Oct. 11, 2019. (Year: 2019).*

(Continued)

*Primary Examiner* — Jialong He
(74) *Attorney, Agent, or Firm* — HG LAW LLP

(57) ABSTRACT

Systems and methods may be used to automatically detect a query in interactive content. A system may implement a method that includes receiving an audible signal. The method may include determining that a portion of the audible signal includes a natural language component. The method may include determining whether the natural language component of the audible signal includes a trigger phrase. A content identifier (ID) may be generated on a condition that the natural language output includes the trigger phrase. The method may include determining an electronic device associated with the content ID and transmitting an inaudible signal that includes the content ID and the trigger phrase. The inaudible signal may configure the electronic device to activate an operational mode of the electronic device when the electronic device detects future instances of the trigger phrase.

19 Claims, 8 Drawing Sheets

Related U.S. Application Data continuation of application No. 16/296,948, filed on Mar. 8, 2019, now Pat. No. 11,074,914.

(51) Int. Cl.

| | |
|---|---|
| ***G10L 13/00*** | (2006.01) |
| ***G10L 15/18*** | (2013.01) |
| *G10L 15/08* | (2006.01) |

(52) U.S. Cl.

CPC .................. *G10L 2015/088* (2013.01); *G10L 2015/223* (2013.01)

(56) References Cited

U.S. PATENT DOCUMENTS

| | | | |
|---|---|---|---|
| 9,472,196 | B1 * | 10/2016 | Wang ...................... G10L 15/19 |
| 10,339,936 | B2 | 7/2019 | Storti |
| 10,932,344 | B2 | 2/2021 | Shoop et al. |
| 10,956,123 | B2 | 3/2021 | Shoop et al. |
| 11,011,169 | B2 | 5/2021 | Shoop et al. |
| 11,074,914 | B2 | 7/2021 | Shoop et al. |
| 11,522,619 | B2 | 12/2022 | Shoop et al. |
| 11,677,479 | B2 | 6/2023 | Shoop et al. |
| 11,711,879 | B2 | 7/2023 | Shoop |
| 11,960,789 | B2 | 4/2024 | Shoop et al. |
| 11,978,446 | B2 | 5/2024 | Shoop et al. |
| 12,033,626 | B2 | 7/2024 | Shoop et al. |
| 12,063,076 | B2 | 8/2024 | Shoop et al. |
| 12,334,987 | B2 | 6/2025 | Shoop et al. |
| 12,430,098 | B2 | 9/2025 | Shoop et al. |
| 12,676,150 | B2 | 7/2026 | Shoop et al. |
| 2005/0024488 | A1 | 2/2005 | Borg |
| 2008/0002606 | A1 | 1/2008 | Cheung et al. |
| 2008/0086742 | A1 | 4/2008 | Aldrey et al. |
| 2008/0155633 | A1 | 6/2008 | Watson |
| 2011/0002471 | A1 | 1/2011 | Wihardja et al. |
| 2011/0165912 | A1 | 7/2011 | Wang et al. |
| 2011/0214143 | A1 | 9/2011 | Rits et al. |
| 2011/0251954 | A1 | 10/2011 | Chin |
| 2012/0075083 | A1 | 3/2012 | Isaacs |
| 2012/0127072 | A1 | 5/2012 | Kim |
| 2012/0295560 | A1 | 11/2012 | Mufti |
| 2013/0080092 | A1 | 3/2013 | Yogeeswaran et al. |
| 2013/0198786 | A1 | 8/2013 | Cook et al. |
| 2014/0029768 | A1 | 1/2014 | Hong et al. |
| 2015/0113094 | A1 | 4/2015 | Williams et al. |
| 2015/0162006 | A1 | 6/2015 | Kummer |
| 2015/0169066 | A1 | 6/2015 | Plagemann et al. |
| 2015/0188643 | A1 | 7/2015 | Ansell |
| 2015/0382047 | A1 | 12/2015 | Van Os et al. |
| 2016/0019901 | A1 | 1/2016 | Topchy et al. |
| 2016/0165333 | A1 | 6/2016 | Gokingco et al. |
| 2017/0118697 | A1 | 4/2017 | Soldati et al. |
| 2018/0322881 | A1 | 11/2018 | Min et al. |
| 2018/0343481 | A1 | 11/2018 | Loheide et al. |
| 2018/0350356 | A1 | 12/2018 | Garcia |
| 2019/0043471 | A1 * | 2/2019 | Maziewski .............. H04K 3/00 |
| 2019/0043503 | A1 | 2/2019 | Bauer et al. |
| 2019/0122691 | A1 * | 4/2019 | Roy ......................... H04B 1/04 |
| 2020/0068245 | A1 | 2/2020 | Sinnott et al. |
| 2020/0082816 | A1 | 3/2020 | Mahajan |
| 2020/0112455 | A1 | 4/2020 | Shoop et al. |
| 2020/0286474 | A1 | 9/2020 | Shoop et al. |
| 2020/0286503 | A1 | 9/2020 | Shoop et al. |
| 2020/0287632 | A1 | 9/2020 | Shoop et al. |
| 2020/0319845 | A1 | 10/2020 | Shoop et al. |
| 2020/0356338 | A1 | 11/2020 | Shoop et al. |
| 2021/0235564 | A1 | 7/2021 | Shoop et al. |
| 2021/0241767 | A1 | 8/2021 | Shoop et al. |
| 2021/0255827 | A1 | 8/2021 | Shoop et al. |
| 2021/0319794 | A1 | 10/2021 | Shoop et al. |
| 2023/0155691 | A1 | 5/2023 | Shoop et al. |
| 2023/0328864 | A1 | 10/2023 | Shoop et al. |
| 2023/0361886 | A1 | 11/2023 | Shoop et al. |
| 2024/0345802 | A1 | 10/2024 | Shoop et al. |
| 2024/0395248 | A1 | 11/2024 | Shoop et al. |
| 2025/0350375 | A1 | 11/2025 | Shoop et al. |

FOREIGN PATENT DOCUMENTS

| | | | |
|---|---|---|---|
| WO | 2020185636 | A1 | 9/2020 |
| WO | 2020227339 | A1 | 11/2020 |

OTHER PUBLICATIONS

U.S. Appl. No. 18/771,899, filed Jul. 12, 2024, David D. Shoop.

U.S. Appl. No. 18/601,162, filed Mar. 11, 2024, David D. Shoop.

Anonymous, "Secret Ultrasonic Commands Can Control Your Smartphone, Say Researchers", MIT Technology Review, https://www.technologyreview.com/2017/ 09/11/4049/secret-ultrasonic-commands-can-control-your-smartphone-say-researchers/ (2017) (8 pages).

He, et al. "Canceling inaudible voice commands against voice control systems," The 25th Annual International Conference on Mobile Computing and Networking. 2019. (2019) (15 pages).

Lisnr Case Studies Lisnr/The Data-Over-Audio Leader, Discovery Channel. https://lisnr.com/resources/case-studies/, Oct. 15, 2018 (Last visited Mar. 8, 2019) (1 page).

PCT International Search Report for International Patent Application PCT/US2020/031564, dated Aug. 18, 2020 (16 pages).

PCT International Search Report in corresponding International Patent Application No. PCT/US2020/021610, dated Jun. 9, 2020 (4 pages).

PCT International Search Report in corresponding International Patent Application PCT/US2020/031564, dated Aug. 18, 2020 (16 pages).

PCT International Search Report in International Patent Application No. PCT/US2020/021610, dated Jun. 9, 2020 (4 pages).

Roy et al. "Inaudible voice commands: The long-range attack and defense." 15th {USENIX} Symposium on Networked Systems Design and Implementation ({NSDI} 18) (2018) (14 pages).

Zhang et al. "Dolphinattack: Inaudible voice commands." Proceedings of the 2017 ACM SIGSAC conference on computer and communications security (2017) (15 pages).

U.S. Appl. No. 18/544,918, filed Dec. 19, 2023, David D. Shoop.

U.S. Appl. No. 19/213,819, filed May 20, 2025, David D. Shoop.

U.S. Appl. No. 19/307,935, filed Aug. 22, 2025, David D. Shoop.

* cited by examiner

AUTOMATED DEVICE ACTIVATION IN INTERACTIVE CONTENT

CROSS-REFERENCE TO RELATED APPLICATIONS

This application is a continuation of U.S. patent application Ser. No. 17/355,849, filed Jun. 23, 2021, which is a continuation of U.S. patent application Ser. No. 16/296,948, filed Mar. 8, 2019, now U.S. Pat. No. 11,074,914, the disclosure of which are hereby incorporated by reference herein in their entireties.

TECHNICAL FIELD

This disclosure relates to systems and methods for interfacing with electronic devices using inaudible frequencies.

BACKGROUND

Electronic devices, such as voice-activated electronic devices, do not act unless activated by an audible wake word. These audible wake words detract from natural interactions between users and the voice-activated electronic devices. To remove the burden from the user to activate the voice-activated electronic device, it would be desirable to silently activate the voice-activated electronic device. It would be desirable to activate the voice-activated device using a non-interfering communication such that the content for user consumption is not interrupted. It would also be desirable for the system to distinguish audio cues from the content and from the user. It would also be desirable to ensure that the voice-activated electronic device perform the specific function intended by the user. It would also be desirable for the system to communicate without requiring prior pairing with the voice-activated electronic device. It would also be desirable to communicate with multiple and varying types of voice-activated electronic devices simultaneously.

SUMMARY

Disclosed herein are implementations of systems and methods for automated query detection in interactive content. The automated detection of queries in interactive content may be used in an advertisement context to allow a user to naturally and seamlessly interact with content to receive information regarding a particular product. The automated detection of queries in interactive content may be used in a camera system to allow a user to naturally and seamlessly alert law enforcement of a potential intruder.

In an aspect, a method may include receiving an audible signal. The method may include determining that a portion of the audible signal includes speech. The method may include translating at least the portion of the audible signal. The portion of the audible signal may be translated into a natural language output. The method may include generating an identifier (ID) associated with the speech. The ID may be generated on a condition that the natural language output includes a trigger. The method may include generating an inaudible signal that includes the ID. The method may include synchronizing the inaudible signal with the audible signal. The method may include transmitting the audible signal at a first frequency. The method may include transmitting the inaudible signal at a second frequency.

In an aspect, an electronic device that includes a receiver, a transmitter, and a processor. The receiver may be configured to receive an audible signal. The processor may include an automated speech recognition (ASR) engine, a natural language understanding (NLU) engine, or both. The ASR engine may be configured to determine that a portion of the audible signal includes speech. The NLU engine may be configured to translate at least the portion of the audible signal into a natural language output. The processor may be configured to generate an ID associated with the speech. The ID may be generated on a condition that the natural language output includes a trigger. The processor may be configured to generate an inaudible signal. The inaudible signal may include the ID. The processor may be configured to synchronize the inaudible signal with the audible signal. The transmitter may be configured to transmit the audible signal at a first frequency and the inaudible signal at a second frequency.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Typical systems for interactive content consumption require a user to perform multiple steps to activate an electronic device in the context of the content, resulting in a disjointed and undesirable user experience. The embodiments disclosed herein may augment user interaction with content by providing seamless communication between content devices and other electronic devices using inaudible frequencies. The inaudible frequencies enable a non-intrusive and distinct path for electronic device commands without requiring the user to activate the electronic device to initiate the path.

Figure 1:
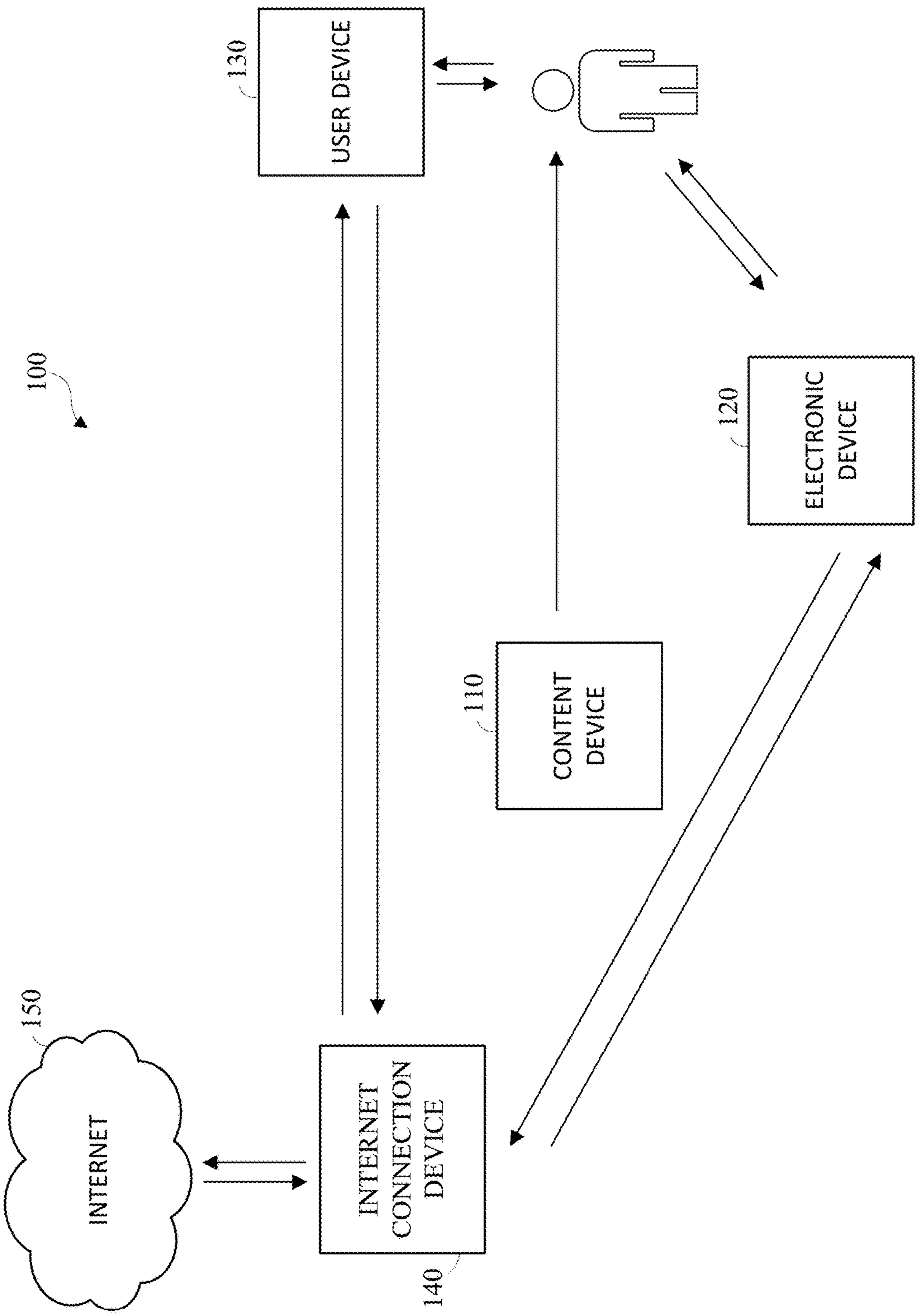
FIG. 1 is a block diagram of an example of a system for content consumption.

FIG. 1 is a block diagram of an example of a system 100 for content consumption. System 100 includes a content device 110, an electronic device 120, and a user device 130. The electronic device 120 is configured to communicate with the user and an internet connection device 140. The internet connection device 140 is configured to communicate with the user device 130 and internet 150.

The content device 110 is configured to transmit content to the user. Examples of the content device 110 include, and are not limited to, a television (TV), a personal computer (PC), a tablet, a mobile phone, a gaming device, a satellite receiver, a terrestrial radio receiver, an audio receiver, a set-top-box (STB), a speaker, a camera, a personal wearable device, or an augmented reality/virtual reality (AR/VR) device. The content may include audio content, video content, or both. Audio content may include streaming audio, recorded audio, broadcast audio, point-to-point audio, or any combination thereof. Video content may include streaming video, recorded video, broadcast video, point-to-point video, or any combination thereof. The audio content, video content, or both, may be in real-time or pre-recorded.

The electronic device 120 may be any device configured to interface with the user. The electronic device 120 may include multi-mode capabilities, and may include multiple transceivers for communicating with different wireless networks over different wireless links. For example, the electronic device 120 may be configured to communicate with a device employs a Bluetooth radio technology, and with a base station that employs an IEEE 802 radio technology. For example, the electronic device 120 may be a voice-activated electronic device, a personal hub used to connect multiple devices that use common communication protocols, a TV, a PC, a tablet, a mobile phone, a gaming device, a satellite receiver, a terrestrial radio receiver, an audio receiver, an STB, a speaker, a camera, a personal wearable device, an AR/VR device, or any device configured to interface with the user.

The user device 130 may be any device configured to interface with the user. The user device 130 may include multi-mode capabilities, and may include multiple transceivers for communicating with different wireless networks over different wireless links. For example, the user device 130 may be configured to communicate with a base station that employs a cellular-based radio technology, and with the base station that employs an IEEE 802 radio technology. The user device 130 may include, for example, a PC, a tablet, a mobile phone, a gaming device, a personal wearable device, an AR/VR device, or any device configured to interface with the user.

The internet connection device 140 may be a wireless router, Home Node B, Home eNode B, or access point, for example, and may utilize any suitable radio access technology for facilitating wireless connectivity in a localized area, such as a home, a place of business, an educational facility, a vehicle, and the like. The internet connection device 140 may communicate with the user device 130 over an air interface, which may be any suitable wireless communication link, for example, radio frequency (RF), microwave, infrared (IR), ultraviolet (UV), visible light, and the like. The internet connection device 140 may implement a radio technology such as IEEE 802.11 to establish a wireless local area network (WLAN). The internet connection device 140 may implement a radio technology such as IEEE 802.15 to establish a wireless personal area network (WPAN). The internet connection device 140 may utilize a cellular-based radio access technology. Example cellular-based radio access technologies include wide-band code division multiple access (WCDMA), Global System for Mobile communications (GSM), Long Term Evolution (LTE), LTE-Advanced (LTE-A), and the like. As shown in FIG. 1, the internet connection device 140 may have a direct connection to the Internet 150. Alternatively, the internet connection device 140 may access the Internet 150 via a core network (not shown). The Internet 150 may include a global system of interconnected computer networks and devices that use common communication protocols, such as the transmission control protocol (TCP), user datagram protocol (UDP) and the internet, protocol (IP) in the TCP/IP internet protocol suite.

Figure 2:
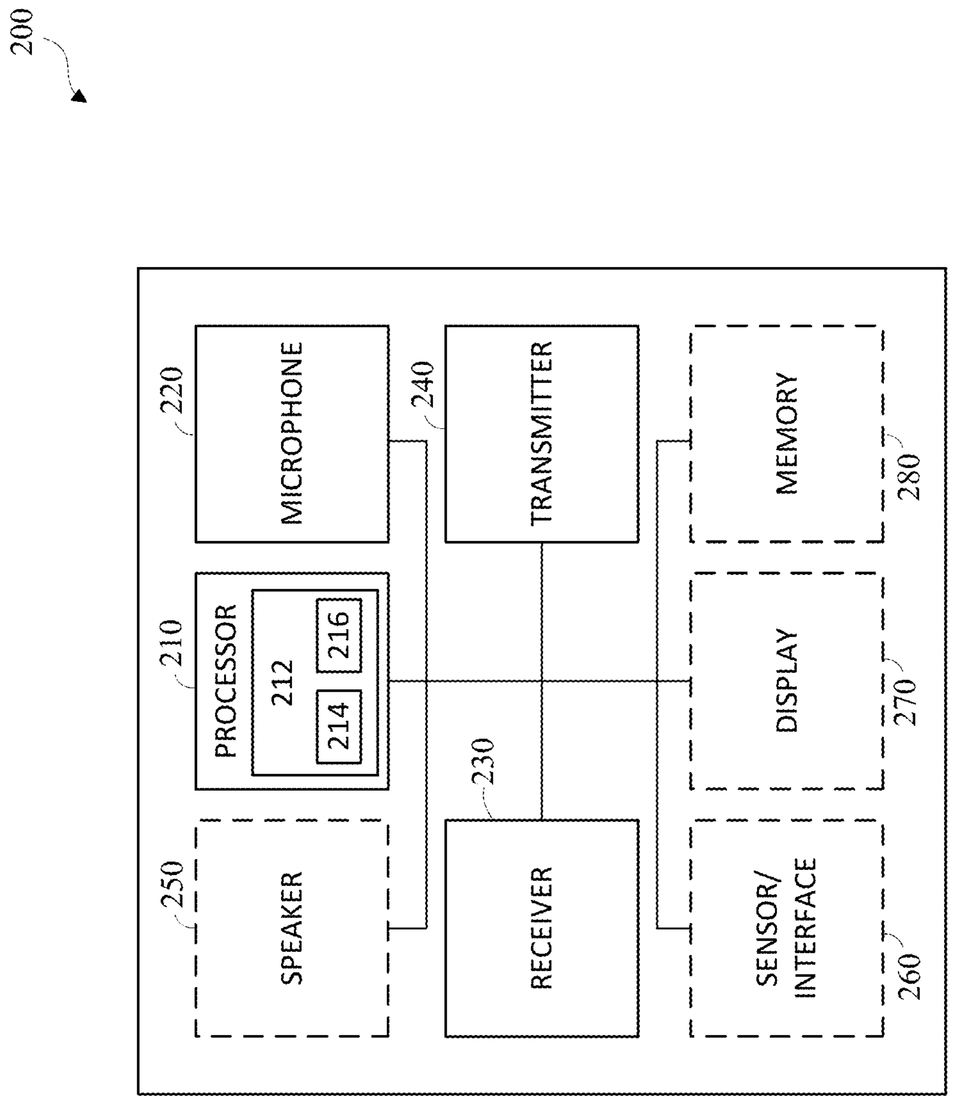
FIG. 2 is a block diagram of an example of an electronic device capable of receiving audible and inaudible inputs in accordance with one or more embodiments of this disclosure.

FIG. 2 is a block diagram of an example of an electronic device 200 capable of receiving audible and inaudible inputs. Example implementations of the electronic device 200 may include the content device 110, electronic device 120, and the user device 130 of FIG. 1. The electronic device 200 includes a processor 210, a microphone 220, a receiver 230, and a transmitter 240. In some implementations, the receiver 230 and transmitter 240 may be combined into a single transceiver unit. In some implementations, the electronic device 200 may include a speaker 250, a sensor/interface 260, a display 270, a memory 280, or any combination thereof The processor 210 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 210 may perform signal coding, data processing, power control, input/output processing, and/or any other functionality that enables the electronic device 200 to operate. The processor 210 may include an artificial intelligence (AI) engine 212. The AI engine 212 may include an automated speech recognition (ASR) engine 214, a natural language understanding (NLU) engine 216, or both. In some implementations, the NLU, the ASR, or both, may include an inflection detection module, an intonation detection module, or both. The inflection detection module and the intonation detection module may respectively detect inflection and intonation of speech using natural language processing (NLP) algorithms. In some implementations, the AI engine 212 may use a camera in conjunction with the ASR, NLU, or both to determine whether the person speaking is asking a question based on speech inflection. The processor 210 may be coupled to the receiver 230 and the transmitter 240. While FIG. 2 depicts the processor 210, the receiver 230, and the transmitter 240 as separate components, it will be appreciated that the processor 210, the receiver 230, and the transmitter 240 may be integrated together in an electronic package or chip.

The microphone 220 is coupled to the processor 210 and may be configured to receive audible and inaudible inputs. The microphone 220 may include multiple microphones to extend the coverage area of audio capture. An audible input may include any audible signals at frequencies perceptible to a human ear from about 20 Hz to about 20,000 Hz. An inaudible input may include any inaudible signals at frequencies that are not perceptible to the human ear from below 20 Hz and above 20,000 Hz. The microphone 220 may be configured to detect a user voice as a user input.

The receiver 230 may be configured to receive signals from a internet connection device, for example internet connection device 140 shown in FIG. 1. In some embodiments, the receiver 230 may be an antenna configured to receive inaudible inputs such as RF signals. In some embodiments, the receiver 230 may be a detector configured to receive inaudible inputs such as IR, UV, or visible light signals, for example. In some embodiments, the receiver 230 may be configured to receive both RF and light signals. It will be appreciated that the receiver 230 may be configured to receive any combination of wireless signals.

The transmitter 240 may be configured to transmit signals to a internet connection device, for example internet connection device 140 shown in FIG. 1. In some embodiments, the transmitter 240 may be an antenna configured to transmit RF signals. In some embodiments, the transmitter 240 may be an emitter configured to transmit IR, UV, or visible light signals, for example. In some embodiments, the transmitter 240 may be configured to transmit both RF and light signals. It will be appreciated that the transmitter 240 may be configured to transmit any combination of wireless signals.

The speaker 250 may be coupled to the processor 210 and may be configured to emit audible and inaudible signals. The speaker 250 may include multiple speakers to extend the sound field.

The sensor/interface 260 may be coupled to the processor 210 and may include one or more software and/or hardware modules that provide additional features, functionality and/or wired or wireless connectivity. For example, the sensor/interface 260 may include an accelerometer, an e-compass, a satellite transceiver, an image sensor (for photographs or video), a universal serial bus (USB) port, a vibration device, a television transceiver, a hands free headset, a Bluetooth® module, a frequency modulated (FM) radio unit, a digital music player, a media player, a video game player module, a keyboard, an Internet browser, and the like. The sensor/interface 260 may be configured to detect motion-based or gesture-based commands. The sensor/interface 260 may be configured to perform facial recognition. For example, facial recognition may be used to correlate a user response to a specific user and to determine which user responses to ignore. For example, if a user is not recognized via facial recognition, a response from that user may be ignored. In some implementations, the sensor/interface 260 may be configured to detect a sign gate or a walk gate of a user to identify the user. A sign gate may function as a virtual fingerprint of a user based on how the user performs specific gestures or signs. A walk gate may function as a virtual fingerprint of a user based on a unique walking gate of the user.

The display 270 may be coupled to the processor 210 and may be a liquid crystal display (LCD) display unit, a light emitting diode (LED) display unit, or an organic light-emitting diode (OLED) display unit. The display 270 may be configured to receive user input, for example, the display 270 may be a capacitive touch display in some embodiments.

The memory 280 may be coupled to the processor 210. The memory 280 may include volatile memory, persistent storage, or both. Volatile memory may include random access memory (RAM), dynamic random access memory (DRAM), static random access memory (SRAM), and the like. Persistent storage may include read-only memory (ROM), a hard disk, or any other type of memory storage device. Persistent storage may include a removable storage element such as a memory stick, a secure digital (SD) memory card, and the like.

Figure 3:
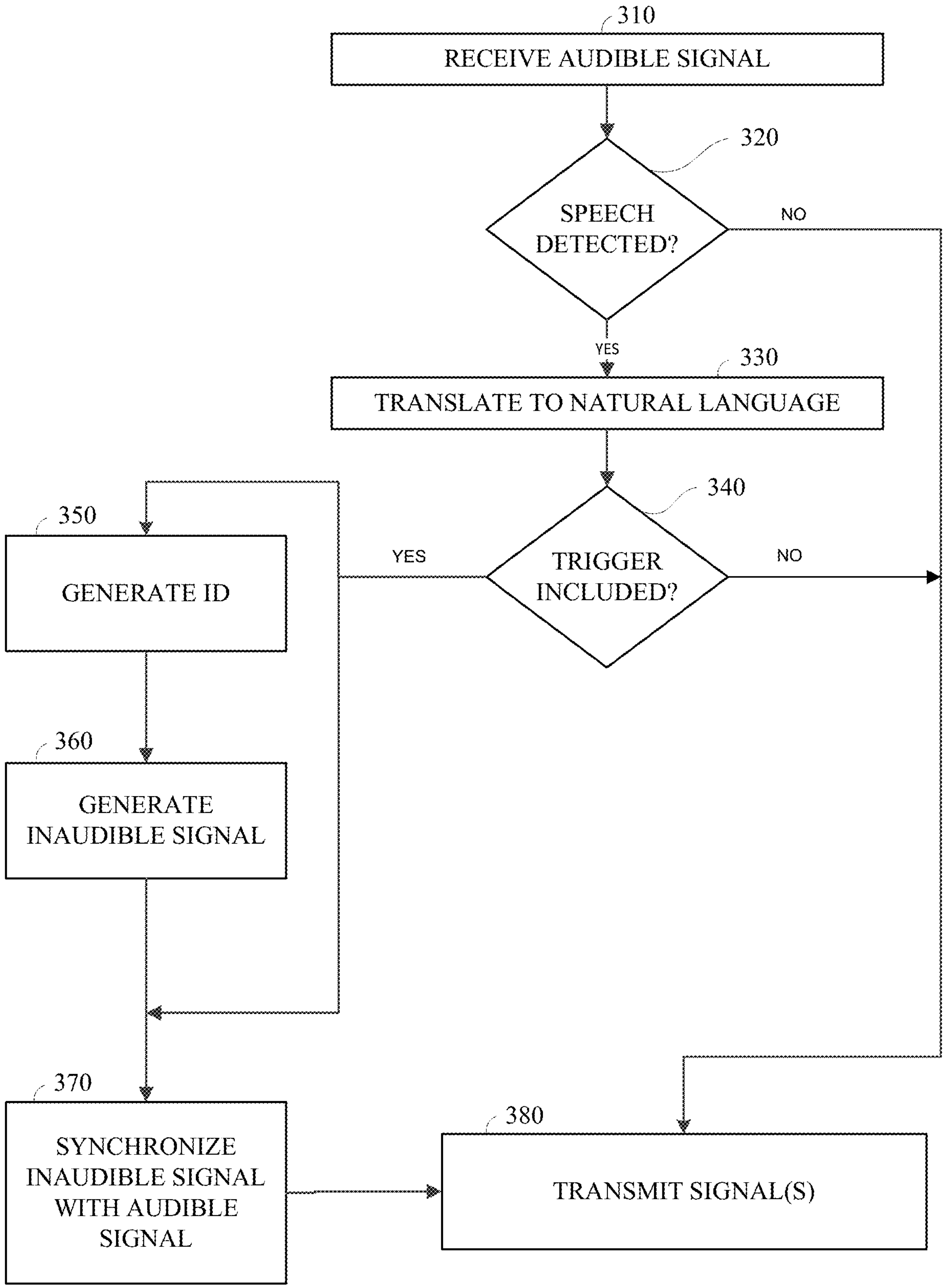
FIG. 3 is a flow diagram of an example of an automatic question detection method in accordance with one or more embodiments of this disclosure.

FIG. 3 is a flow diagram of an example of an automatic question detection method 300 in accordance with one or more embodiments of this disclosure. The method 300 includes receiving an audible signal 310. The audible signal may be received as an unpaired audible signal. The audible signal may be associated with content, for example, audio content, video content, or both. The method 300 includes determining 320 that a portion of the audible signal includes speech. Determining whether a portion of the audible signal includes speech may be performed by the ASR engine 214 shown in FIG. 2. The method 300 includes translating 330 at least the portion of the audible signal into a natural language output. The translation of the audible signal into a natural language output may be performed by the NLU engine 216 shown in FIG. 2. If it is determined 340 that the natural language output includes a trigger, the method 300 includes generating 350 an identifier (ID) associated with the speech. The trigger may be created manually or automatically. In a manual trigger example, a user may indicate the position in time where an event occurred that warrants a trigger to be appended. In an automatic trigger example, the trigger would be created when the NLU engine 216 detects the presence of a question.

The method 300 includes generating 360 an inaudible signal that includes the ID. Generating 360 the inaudible signal may include generating an inaudible phrase. Generating the inaudible phrase may include receiving the natural language output, querying a database for a next ID, outputting a response that includes the next ID, and any combination thereof. Generating the inaudible phrase may include associating the natural language output to the next ID and storing the associated natural language output and the next ID in the database. Generating 360 and inaudible signal may include generating a text-to-speech signal that includes the inaudible phrase. Generating 360 the inaudible signal may include transmitting a request associated with the ID, determining a wake command based on the device type, determining a device status, determining an instruction, determining a trigger phrase based on the ID, outputting the inaudible signal, or any combination thereof. The device status may indicate one or more devices that are in an on state, an off state, or a standby state. The instruction may include a phrase to initiate an application, for example a skill invocation phrase. The wake phrase may include multiple wake phrases for a device type. Each wake phrase may be associated with a sub-frequency or sub-frequency range.

The method 300 includes synchronizing 370 the inaudible signal with the audible signal. The method 300 includes transmitting 380 the audible signal at a first frequency and the inaudible signal at a second frequency. The first frequency may be any frequency within the human audible spectrum. The second frequency may be any frequency that is not within the human audible spectrum. The second frequency may include one or more sub-frequencies. Each sub-frequency may be associated with an electronic device type. For example, sub-frequency A may be associated with a first type of voice-activated device, and sub-frequency B may be associated with a second type of voice-activated device.

The transmitted signals may include the audible signal, the inaudible signal, or both. For example, the audible signal may be paired or associated with an inaudible signal. The audible signal and the inaudible signal may be separate signals or they may be a multiplexed signal. The audible signal and the inaudible signal may be transmitted simultaneously. Alternatively, the audible signal transmission may be delayed relative to the transmission of the inaudible signal and vice versa. The inaudible signal may include a frequency signature, a wake command, an instruction, a content ID, a source ID, or any combination thereof.

Figure 4:
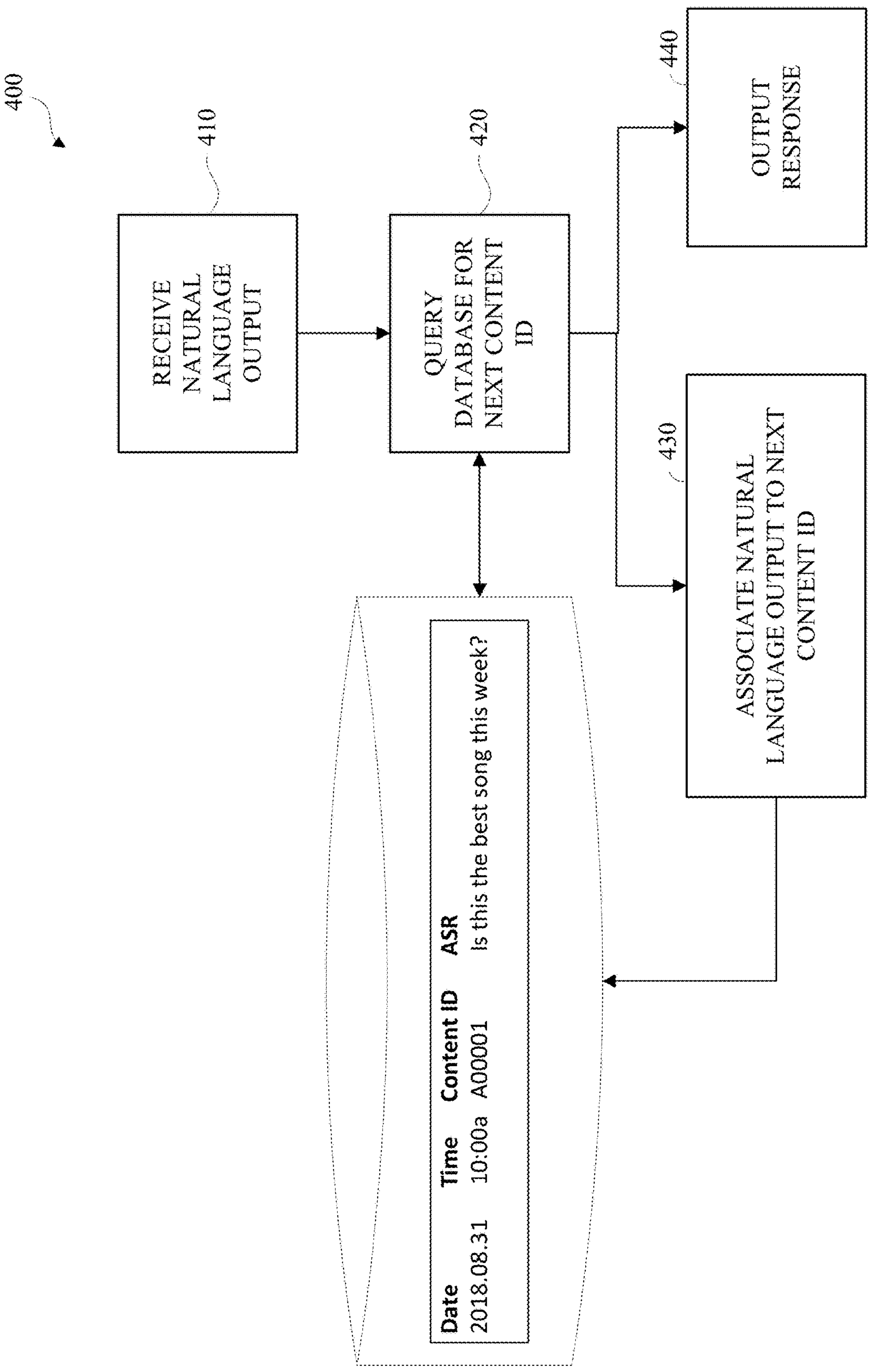
FIG. 4 is a flow diagram of an example of an identification generation and storage method in accordance with one or more embodiments of this disclosure.

FIG. 4 is a flow diagram of an example of an identification generation and storage method 400 in accordance with one or more embodiments of this disclosure. The method 400 includes receiving 410 a natural language output. For example, the received natural language output may include the natural language output from operation 330 shown in FIG. 3. If it is determined that the natural language output is based on a new trigger that is not included in the database, the method 400 includes querying 420 the database for a next content ID. The method 400 includes associating 430 the natural language output to the next content ID. The method 400 may include storing the natural language output associated with the next content ID in the database. For example, the database entry may include a date, time, content ID, and ASR text associated with the natural language output. The method 400 includes outputting 440 a response. In an example, the response may include the content ID and may be sent for phase generation processing.

Figure 5A:
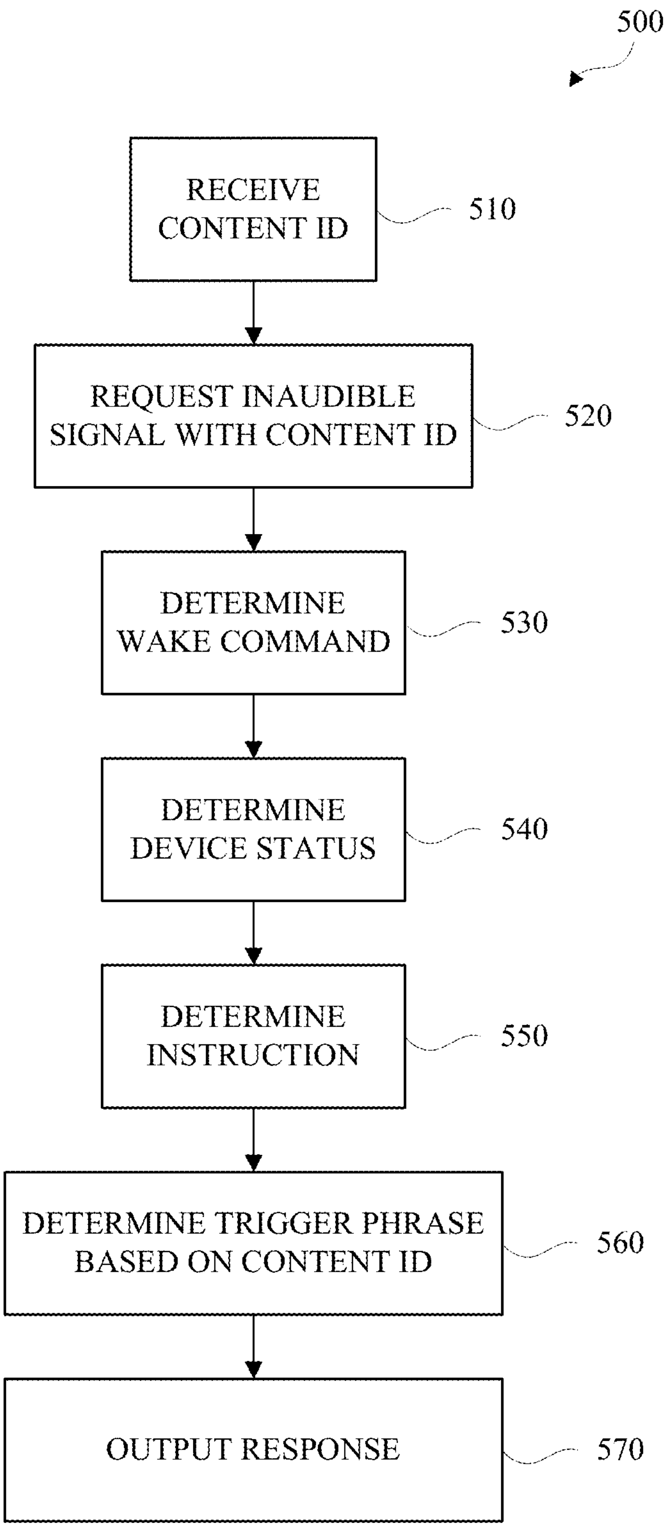
FIG. 5A is a flow diagram of an example of a phrase generation method in accordance with one or more embodiments of this disclosure.

FIG. 5A is a flow diagram of an example of a phrase generation method 500 in accordance with one or more embodiments of this disclosure. The method 500 includes receiving 510 a content ID. For example, the content ID may be received via the output response in operation 440 shown in FIG. 4. The method 500 includes requesting 520 an inaudible signal. The request may be associated with the content ID. The method 500 includes determining 530 a wake command. The method 500 may include determining 540 a device status. The method 500 may include determining 550 an instruction. The method 500 includes determining 560 a trigger phrase based on the content ID. The method 500 includes outputting 570 a response. The response may be referred to as a phrase. The response may include a wake command for each type of electronic device, an instruction, the content ID, a transmission frequency for each type of electronic device, or any combination thereof. The response may be output as a text response.

Figure 5B:
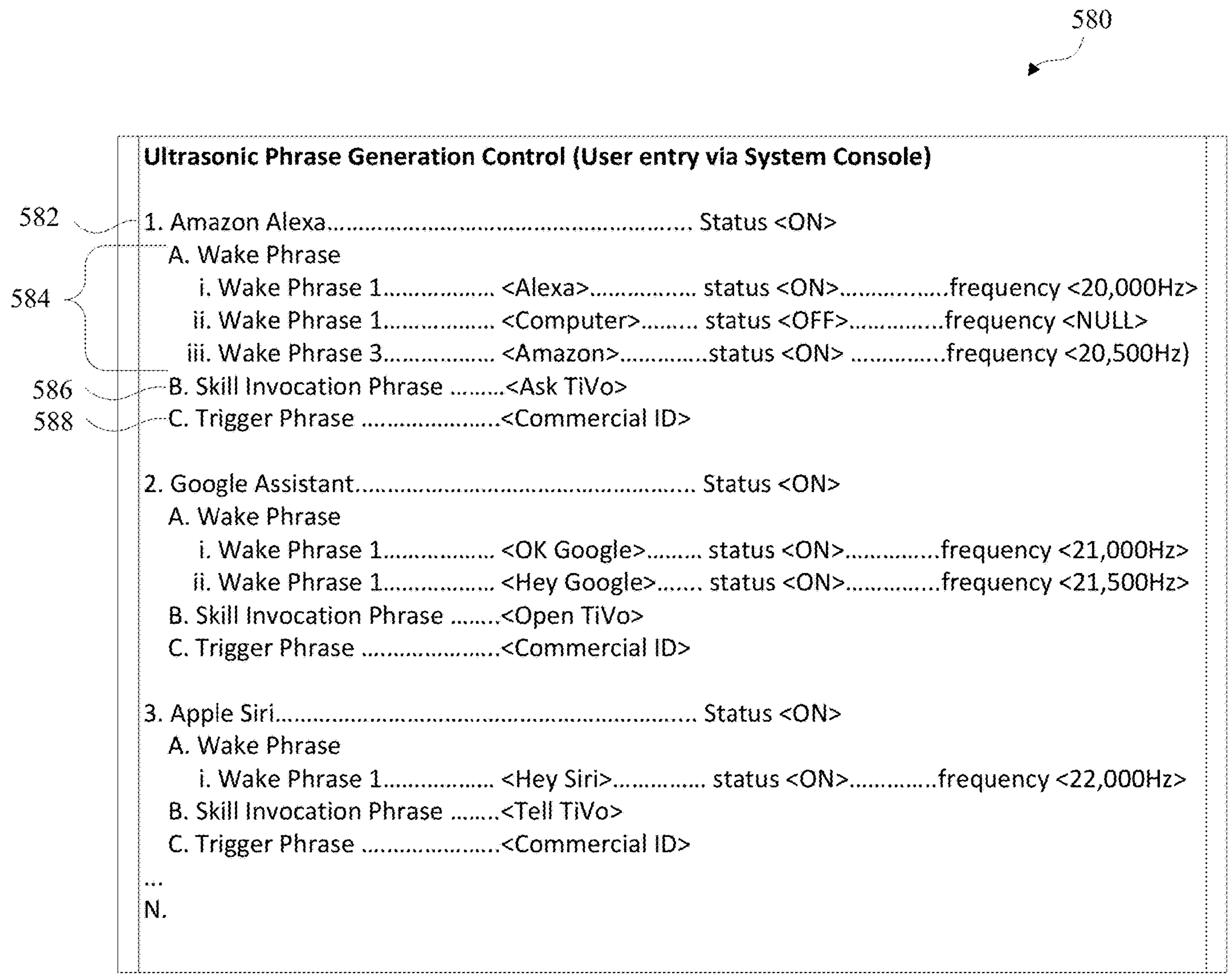
FIG. 5B is a diagram of an example of a phrase table for use with the phrase generation method of FIG. 5A.

FIG. 5B is a diagram of an example of a phrase table 580 for use with the phrase generation method of FIG. 5A. As shown in FIG. 5B, the phrase table includes, for each type of device, a device status 582, one or more wake commands 584, one or more instructions 586, and one or more trigger phrases 588. The device status 582 may indicate one or more devices that are in an on state, an off state, or a standby state. The wake phrase 584 may include multiple wake phrases for a device type. Each wake phrase may be associated with a wake command status, a sub-frequency or sub-frequency range, or both. The instruction 586 may include a phrase to initiate an application or service, for example a skill invocation phrase.

Figure 6:
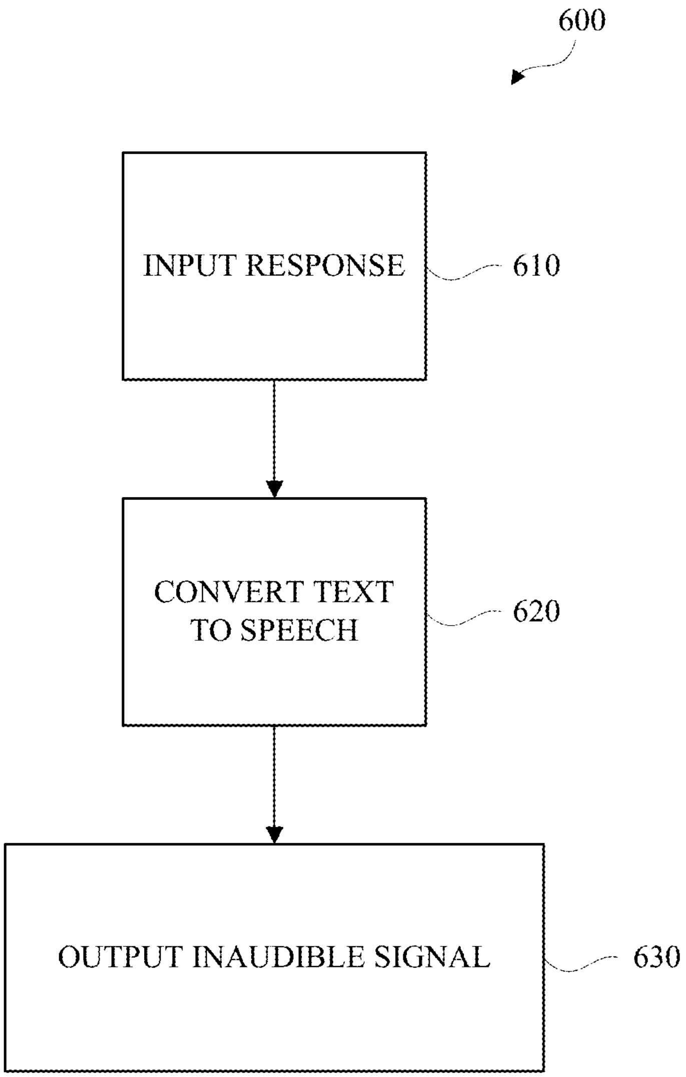
FIG. 6 is a flow diagram of an example of an inaudible signal generation method in accordance with one or more embodiments of this disclosure.

FIG. 6 is a flow diagram of an example of an inaudible signal generation method 600 in accordance with one or more embodiments of this disclosure. The method 600 includes receiving 610 an input response. The input response may be the response that is outputted at operation 570 shown in FIG. 5A. The response may be a text response that includes a wake command for each type of electronic device, an instruction, the content ID, a transmission frequency for each type of electronic device, or any combination thereof. The method 600 includes converting 620 the response text to a speech format. The method 600 includes outputting 630 the speech-formatted response as an inaudible signal.

In a typical situation, a user is required to perform multiple steps to activate an electronic device such as a voice assistant in the context of the content being consumed. For example, the user may be consuming video content that includes an advertisement for a particular product. The audio portion of the video content may ask the user whether they want to learn more about the particular product. Typically, the user would have to invoke a wake command for the electronic device and then ask the device about the particular product. In this situation, it is not uncommon that the user says the wrong product or that the electronic device does not correctly interpret the voice command and retrieves information relating to a different product. In this example, detecting an advertisement in the content and implementing an inaudible signal that is paired or associated with the audio portion of the video content would allow the user to interact with the electronic device with a natural response, without invoking a wake command, and also provide that the information retrieved is for the correct product.

In another typical situation, a user is required to perform multiple steps to activate an electronic device such as a voice assistant in the context of a radio broadcast. The radio broadcast may ask the user for input, for example, in the form of a polling question. Typically, the user would have to invoke a wake command for the electronic device and then speak another voice command to answer the polling question. In this situation, having to invoke a wake command results in a disjointed and undesirable user experience. Automatically detecting the polling question and implementing an inaudible signal that is paired or associated with the radio broadcast in this example would allow the user to interact with the electronic device with a natural response, without invoking a wake command, and also provide a seamless and enjoyable user experience. In addition, the user responses to the polling question may be collected and analyzed.

In another typical situation, a user is required to perform multiple steps to activate an electronic device such as a voice assistant in the context of a hardware device. For example, the user may be alerted of a situation by a camera. In an example, the camera may observe a scene and detect a potential package delivery. The camera may transmit content to the user that includes a video portion and an audio portion. The audio portion of the content may ask the user for input to take an action. For example, based on the scene observed by the camera, the audio portion may ask the user whether they recognize the package, whether confirm receipt of the package, or both. If the user indicates that they do not recognize the package, the sender, the delivery company, or both may be automatically notified that the package may have been misdelivered. Typically, the user would have to invoke a wake command for the electronic device and then speak another voice command to instruct the electronic device to take an action. In this situation, where time is critical, having to invoke a wake command results in a disjointed and undesirable user experience. Detecting a potential situation in an observed scene and implementing an inaudible signal that is paired or associated with the audio portion of the content in this example would allow the user to interact with the electronic device with a natural response, without invoking a wake command, and also provide a seamless and near-instantaneous user experience.

Figure 7:
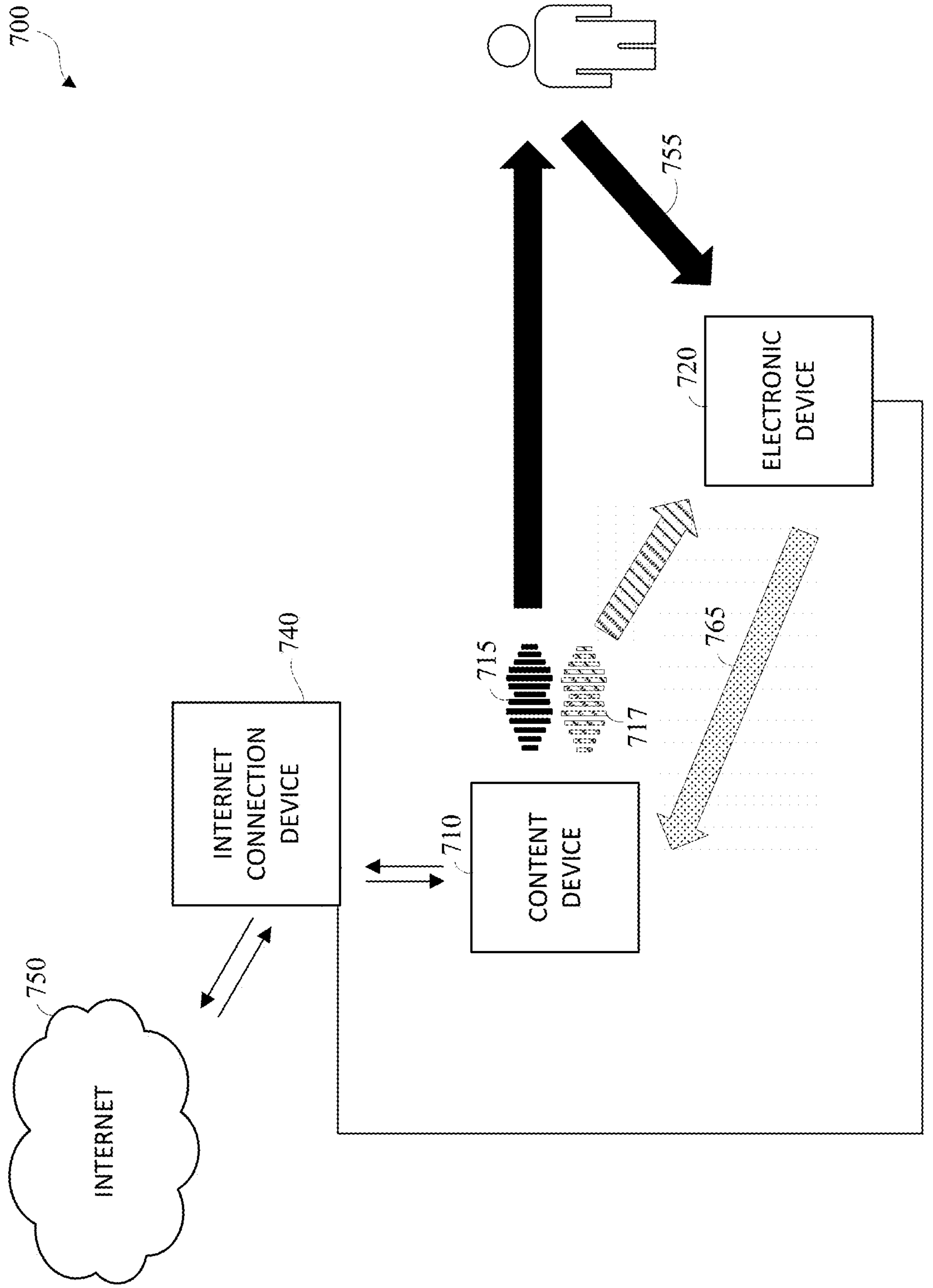
FIG. 7 is a block diagram of an example of a system for pairing audio signals with inaudible signals in accordance with one or more embodiments of this disclosure.

FIG. 7 is a block diagram of an example of a system 700 for pairing audio signals with inaudible signals in accordance with one or more embodiments of this disclosure. The system 700 includes a content device 710 and an electronic device 720. The electronic device 720 is configured to communicate with the user, the content device 710, and an internet connection device 740. The internet connection device 740 is configured to communicate with the content device 710, the electronic device 720, and internet 750.

The system 700 is configured to detect speech in an audible signal and determine whether the speech includes a trigger. The system 700 is configured to generate an inaudible signal and pair the inaudible signal with the audible signal. The system 700 is configured to transmit the inaudible signal in content of an interactive content application that is presented to a user and queue the electronic device 720 to respond in context of the content. The system 700 may generate one or more possible responses based on the context of the content. Examples of interactive content applications include, and are not limited to, electronic book applications, audiobook applications, gaming applications, educational applications, video applications, and any application that provides a user a choice in the outcome of the content. Interactive content applications include real-time content and pre-recorded content.

The system 700 goes beyond pairing inaudible signals with real-time and pre-recorded content to activate the electronic device 720 to be ready to detect a user response by activating a response monitor in the context of the content, a specific activity, software application, or any combination thereof. The system 700 may allow the user to naturally respond to an audible or visual prompt by associating an inaudible signal with an audible or visual signal. The system 700 may enhance user interactivity by setting the electronic device 720 to be in prepared state for a specific context, for example an audiobook context, without the user having to provide the context. For example, associating an inaudible signal with an audible signal may allow the user to interact with content without having to use a wake command. The system 700 is configured to communicate using inaudible signals without requiring prior pairing between the content device 710 and the electronic device 720. In some embodiments, the system 700 may be configured to control an environmental condition based on the context of the content.

Referring to FIG. 7, the content device 710 is configured to receive real-time or pre-recorded content and transmit the content to the user. Examples of the content device 710 include, and are not limited to, a TV, a PC, a tablet, a mobile phone, a gaming device, a satellite receiver, a terrestrial radio receiver, an audio receiver, an STB, a speaker, a camera, a personal wearable device, or an AR/VR device. The content may include audio content, video content, or both. Audio content may include streaming audio, recorded audio, broadcast audio, point-to-point audio, or any combination thereof. Video content may include streaming video, recorded video, broadcast video, point-to-point video, or any combination thereof.

Referring to FIG. 7, the content device 710 is configured to receive real-time or pre-recorded content. The content may include audio content, video content, or both. The content device 710 is configured to generate an inaudible signal based on the content. The content device 710 is configured to pair or associate an audible signal 715 (shown in solid black) with an inaudible signal 717 (shown in cross-hatching). The audible signal 715 may include an audible request that is intended to elicit a response from the user. The audible request may include a request to choose an option in the interactive content application, a polling question, or any audible word or phrase to elicit a user response. The inaudible signal 717 may include a frequency signature, a wake command, an instruction, a content ID, a source ID, or any combination thereof. The frequency signature may be associated with an electronic device type. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may be a request and be used to determine a content characteristic, for example, a content context of the audible request. In an example, the content context may include an inference based on the content ID that may influence the meaning or effect of the audible request, the inaudible signal, a portion of the inaudible signal such as the instruction, or any combination thereof.

The electronic device 720 may be configured to interface with the user. The electronic device 720 may include multimode capabilities, and may include multiple transceivers for communicating with different wireless networks over different wireless links. For example, the electronic device 720 may be configured to communicate with a device employs a Bluetooth radio technology, and with a base station that employs an IEEE 802 radio technology. For example, the electronic device 720 may be a voice-activated electronic device, a personal hub used to connect multiple devices that use common communication protocols, a TV, a PC, a tablet, a mobile phone, a gaming device, a satellite receiver, a terrestrial radio receiver, an audio receiver, an STB, a speaker, a camera, a personal wearable device, or an AR/VR device.

The electronic device 720 may receive an audio input. The audio input may include an audible signal, an inaudible signal, or both. In an example, the electronic device 720 may be configured to detect an inaudible signal in the audio input, for example the inaudible signal 717 from the content device 710. The electronic device 720 may be configured to activate a response monitor. Activating the response monitor may include activating a microphone, for example microphone 220 shown in FIG. 2. Activating the response monitor may be responsive to a frequency signature of the inaudible signal 717, the wake command of the inaudible signal 717, or both. The electronic device 720 may activate the response monitor for a predetermined time. The response monitor may be a voice response monitor that is configured to monitor audio inputs for a user response 755. The user response 755 may be a voice input, a gesture, a text input, a touch input, or any suitable input. In an example, by activating the response monitor, the electronic device 720 may monitor audio inputs for one or more predetermined user responses and queue a contextual response based on the audio input, for example, the user response 755 to the audio input. In another example, by activating the response monitor, the electronic device 720 may monitor an audio input for a user response 755, queue a contextual response based on the audio input, and determine whether the user response 755 corresponds to the contextual response. For example, the electronic device 720 may determine a content characteristic of the audible signal 715 based on the inaudible signal 717. The electronic device 720 may be configured to generate one or more messages based on the content characteristic of the audible signal 715. Each generated message may be a contextual response to the audible signal 715. The electronic device 720 may be configured to transmit the one or more messages if the electronic device 720 determines that the user response 755 corresponds to at least one of the one or more messages. The message 765 may include an instruction. For example, in an interactive content application such as an audiobook, the instruction may command the interactive content application to jump to a particular page based on the user response 755. The electronic device 720 may be configure to transmit the message 765 (shown in stippling) to the content device 710 using RF or any suitable wireless communication link. In some embodiments, the electronic device 720 may be configured to transmit the message 765 to internet connection device 740 using RF or any suitable wireless communication link.

The internet connection device 740 may be a wireless router, Home Node B, Home eNode B, or access point, for example, and may utilize any suitable radio access technology for facilitating wireless connectivity in a localized area, such as a home, a place of business, an educational facility, a vehicle, and the like. The internet connection device 740 may communicate with the content device 710, the electronic device 720, or both, over an air interface, which may be any suitable wireless communication link, for example, RF, microwave, IR, UV, visible light, and the like. The internet connection device 740 may implement a radio technology such as IEEE 802.11 to establish a WLAN. The internet connection device 740 may implement a radio technology such as IEEE 802.15 to establish a WPAN. The internet connection device 740 may utilize a cellular-based radio access technology. Example cellular-based radio access technologies include WCDMA, GSM, LTE, LTE-A, and the like. As shown in FIG. 7, the internet connection device 740 may have a direct connection to the Internet 750. Alternatively, the internet connection device 740 may access the Internet 750 via a core network (not shown). The Internet 750 may include a global system of interconnected computer networks and devices that use common communication protocols, such as the TC, UDP and the IP in the TCP/IP internet protocol suite.

The internet connection device 740 may receive the message 765 and retrieve information regarding the interactive content application based on the user response 755. The information regarding the interactive content application may be retrieved from the internet 750. The information regarding the interactive content application may be based on the content ID. The information regarding the interactive content application may be transmitted to the content device 710 without the user having to use any wake commands while interacting with the content.

Although features and elements are described above in particular combinations, one of ordinary skill in the art will appreciate that each feature or element may be used alone or in combination with any of the other features and elements. In addition, the embodiments described herein may be implemented in a computer program, software, or firmware incorporated in a computer-readable medium for execution by a computer or processor. Examples of computer-readable media include electronic signals, (transmitted over wired or wireless connections), and computer-readable storage media. Examples of computer-readable storage media include, but are not limited to, a read only memory (ROM), a random access memory (RAM), a register, a cache memory, a semiconductor memory device, a magnetic media, (e.g., an internal hard disc or a removable disc), a magneto-optical media, and an optical media such as a compact disc (CD) or a digital versatile disc (DVD). While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

receiving an audible signal from a media device, wherein the audible signal comprises a natural language component;

based at least in part on determining that the natural language component comprises a trigger component:

identifying a voice-activated electronic device; and transmitting one or more inaudible signals comprising (a) a wake phrase for the voice-activated electronic device, (b) a skill invocation phrase for the voice-activated electronic device, and (c) a trigger phrase, wherein:

the wake phrase causes the voice-activated electronic device to enter an active state; and the skill invocation phrase configures the voice-activated electronic device to, when in the active state, initiate a particular application of the voice-activated electronic device and prepare the voice-activated electronic device to perform a particular activity.

2. The method of claim 1, wherein the voice-activated electronic device is connected to a content system via a network.

3. The method of claim 1, wherein determining that the natural language component comprises the trigger component is performed by at least one of: an automated speech recognition (ASR) engine, or a natural language understanding (NLU) engine.

4. The method of claim 1, further comprising accessing a database that lists a plurality of voice-activated electronic devices, respective associated wake commands, and respective associated skill invocation phrases to determine at least one of: (a) the wake phrase for the voice-activated electronic device or (b) the skill invocation phrase for the voice-activated electronic device.

5. The method of claim 4, wherein a frequency, a device type, and a device status associated with the voice-activated electronic device is stored within the database.

6. The method of claim 1, wherein:

the voice-activated electronic device is configured to operate a plurality of applications; and the skill invocation phrase configures the voice-activated electronic device to, when in the active state, initiate the particular application of the plurality of applications.

7. The method of claim 1, wherein the skill invocation phrase further configures the voice-activated electronic device to, when in the active state, initiate a particular service associated with the voice-activated electronic device.

8. The method of claim 1, further comprising identifying a plurality of voice-activated electronic devices comprising the voice-activated device, wherein:

the one or more inaudible signals comprise (a) a plurality of wake phrases respectively corresponding to the plurality of voice-activated electronic devices and (b) a plurality of skill invocation phrases respectively corresponding to the plurality of voice-activated electronic devices;

the plurality of wake phrases cause each voice-activated device of the plurality of voice-activated electronic devices to enter a respective active state; and the plurality of skill invocation phrases configure each voice-activated electronic device of the plurality of voice-activated electronic devices to, when in the respective active state, initiate a distinct respective application.

9. A system comprising:

control circuitry configured to:

receive an audible signal from a media device, wherein the audible signal comprises a natural language component;

based at least in part on determining that the natural language component comprises a trigger component:
identify a voice-activated electronic device; and
transmit one or more inaudible signals comprising (a) a wake phrase for the voice-activated electronic device, (b) a skill invocation phrase for the voice-activated electronic device, and (c) a trigger phrase, wherein:
the wake phrase causes the voice-activated electronic device to enter an active state; and
the skill invocation phrase configures the voice-activated electronic device to, when in an active state, initiate a particular application of the voice-activated electronic device and prepare the voice-activated electronic device to perform a particular activity.

10. The system of claim 9, wherein the voice-activated electronic device is connected to a content system via a network.

11. The system of claim 9, wherein determining that the natural language component comprises the trigger component is performed by at least one of: an automated speech recognition (ASR) engine, or a natural language understanding (NLU) engine.

12. The system of claim 9, wherein the control circuitry is further configured to access a database that lists a plurality of voice-activated electronic devices, respective associated wake commands, and respective associated skill invocation phrases to determine at least one of: (a) the wake phrase for the voice-activated electronic device or (b) the skill invocation phrase for the voice-activated electronic device.

13. The system of claim 12, wherein a frequency, a device type, and a device status associated with the voice-activated electronic device is stored within the database.

14. The system of claim 9, wherein:
the voice-activated electronic device is configured to operate a plurality of applications; and
the skill invocation phrase configures the voice-activated electronic device to, when in the active state, initiate the particular application of the plurality of applications.

15. The system of claim 9, wherein the skill invocation phrase further configures the voice-activated electronic device to, when in the active state, initiate a particular service associated with the voice-activated electronic device.

16. The system of claim 9, wherein:
the control circuitry is further configured to identify a plurality of voice-activated electronic devices comprising the voice-activated device;
the one or more inaudible signals comprise (a) a plurality of wake phrases respectively corresponding to the plurality of voice-activated electronic devices and (b) a plurality of skill invocation phrases respectively corresponding to the plurality of voice-activated electronic devices;
the plurality of wake phrases cause each voice-activated device of the plurality of voice-activated electronic devices to enter a respective active state; and
the plurality of skill invocation phrases configure each voice-activated electronic device of the plurality of voice-activated electronic devices to, when in the respective active state, initiate a distinct respective application.

17. A non-transitory computer-readable medium having instructions encoded thereon that, when executed by control circuitry, cause the control circuitry to:
receive an audible signal from a media device, wherein the audible signal comprises a natural language component;
based at least in part on determining that the natural language component comprises a trigger component:
identify a voice-activated electronic device;
transmit one or more inaudible signals comprising (a) a wake phrase for the voice-activated electronic device, (b) a skill invocation phrase for the voice-activated electronic device, and (c) a trigger phrase, wherein:
the wake phrase causes the voice-activated electronic device to enter an active state; and
the skill invocation phrase configures the voice-activated electronic device to, when in the active state, initiate a particular application of the voice-activated electronic device.

18. The non-transitory computer-readable medium of claim 17, wherein the voice-activated electronic device is connected to a content system via a network.

19. The non-transitory computer-readable medium of claim 17, wherein determining that the natural language component comprises the trigger component is performed by at least one of: an automated speech recognition (ASR) engine, or a natural language understanding (NLU) engine.

* * * * *